Figure 10:
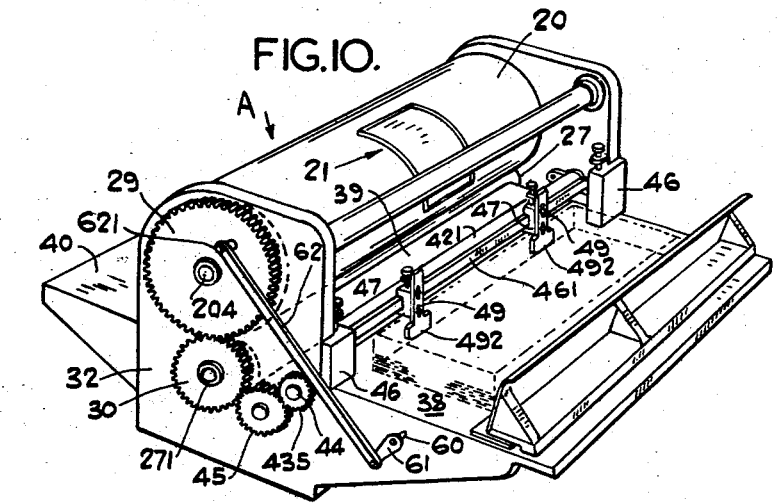

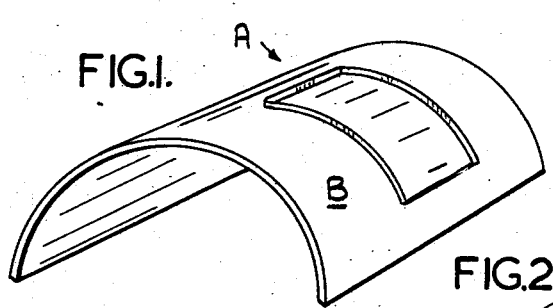
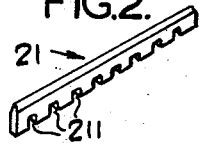
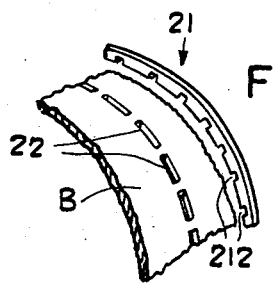
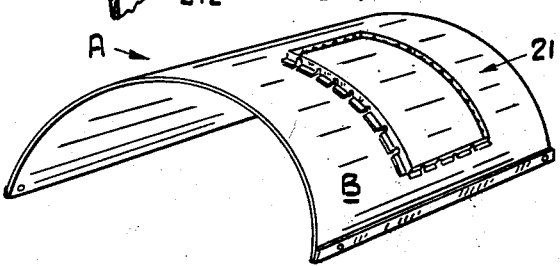
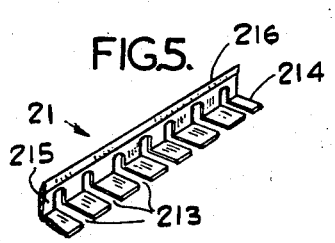
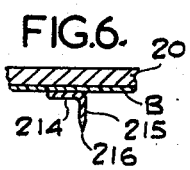

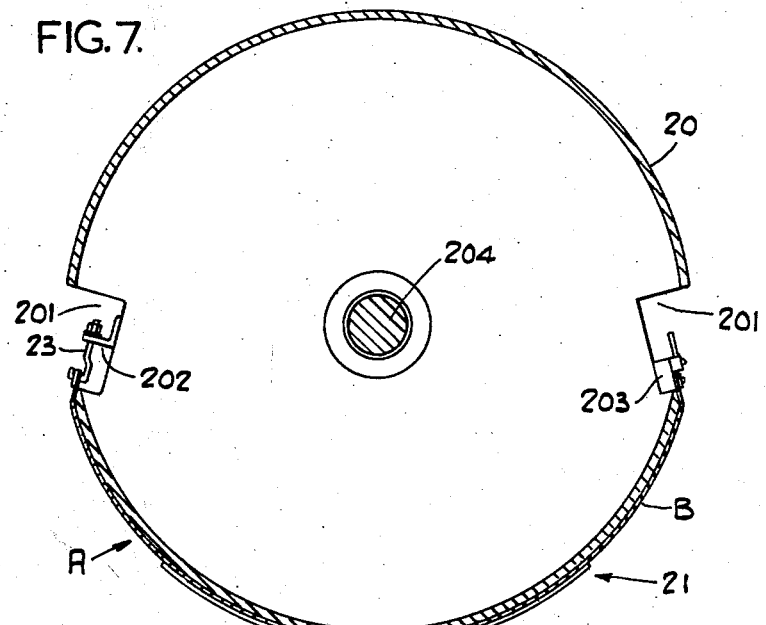
FIG. 7.
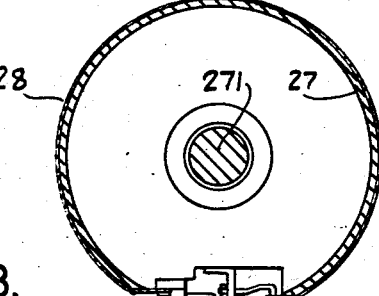
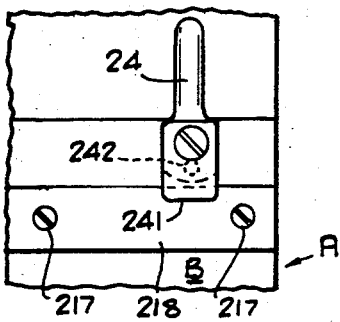
FIG. 8.
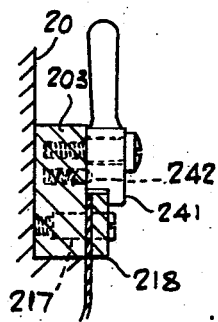
FIG. 9.

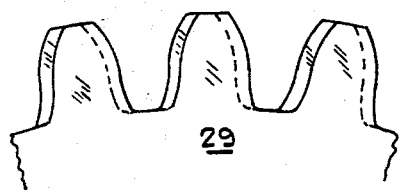
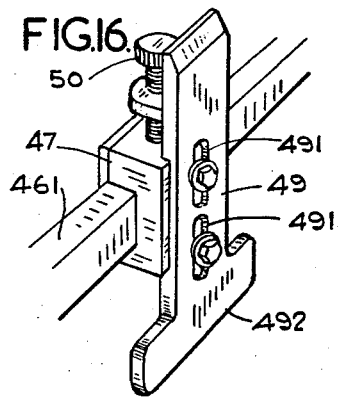
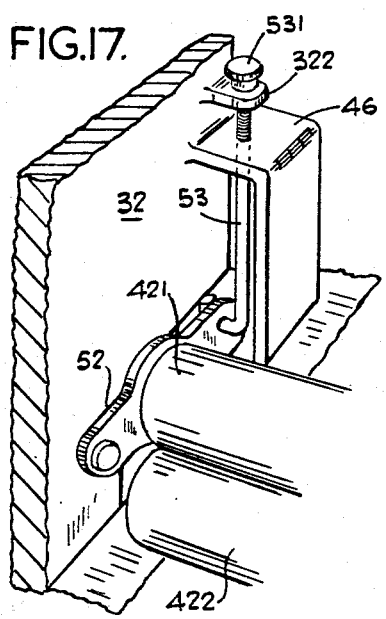

United States Patent Office 3,190,194
Patented June 22, 1965

3,190,194
APPARATUS FOR CREASING AND/OR CUTTING CARDBOARD AND ANALOGOUS FLEXIBLE SHEET MATERIAL
Kenneth Kirby, Keith Roland Tallett Kirby, and Colin Walter Kirby, all of Walsall, England, assignors to Kirby's (Engineers) Limited, Walsall, England, a corporation of Great Britain
Original application Aug. 2, 1961, Ser. No. 128,805. Divided and this application Nov. 18, 1963, Ser. No. 324,564
5 Claims. (Cl. 93—58.2)

The present application is a division of our copending application Serial No. 128,805 filed Aug. 2, 1961.

This invention has reference to an improved apparatus or machine for creasing and/or cutting cardboard and analogous flexible sheet material.

According to conventional practice the creasing and/or cutting of cardboard and analogous flexible sheet material is performed in a press with the aid of "formes" which are constituted by flat sheets of plywood having set therein lengths of creasing or cutting "rule" arranged to correspond to the contour of the desired creasing and/or cutting.

The present invention has for its object to provide an improved apparatus for creasing and/or cutting cardboard and analogous flexible sheet material which enables cardboard and analogous flexible sheet material to be creased and/or cut at a faster rate than is possible with the conventional practice aforesaid and thereby making for economy of production.

The apparatus of the present invention is characterized by a forme of arcuate section having set therein lengths of "rule" arranged to the contour of the desired lines of creasing and/or severance. A forme so produced is mounted concentrically on a roller adapted to be positively driven and to cooperate with a second roller constituting an impression roller. The cardboard blank to be creased and/or cut is fed between the nip of the forme carrying roller and the impression roller whereby on rotation of the rollers the cardboard blank is creased and/or cut as required.

The invention further resides in apparatus for creasing and/or cutting cardboard and analogous flexible sheet material in accordance with the novel methods aforesaid.

A machine for carrying the invention into effect will now be described with particular reference to the accompanying drawings wherein the apparatus depicted is intended more specifically for the creasing and/or cutting of corrugated cardboard.

In the drawings:

FIGURE 1 is a perspective view of a forme in accordance with the invention based on plywood, FIGURE 2 is a fragmentary view in perspective of a length of steel creasing or cutting rule constituting the creasing or cutting medium for the plywood forme as illustrated in FIGURE 1, FIGURE 3 is a fragmentary view in perspective illustrating the method of fixing the creasing or cutting rule in the forme as illustrated in FIGURE 1, FIGURE 4 is a perspective view of a forme in accordance with the invention based on sheet metal, FIGURE 5 is a fragmentary view in perspective of a length of steel creasing or cutting rule constituting the basis of the cutting or creasing medium for a steel forme as illustrated in FIGURE 4, FIGURE 6 is a fragmentary view in section illustrating the manner of attaching the lengths of steel creasing or cutting rule as in FIGURE 5 to the steel forme as illustrated in FIGURE 4, FIGURE 7 is a diagrammatic view on an enlarged scale illustrative of the basis of a machine for creasing and/or cutting cardboard in accordance with the invention and illustrating also the method of fixing the forme to the forme carrying rollers, FIGURE 8 is a fragmentary view in front elevation and on an enlarged scale illustrating the manner of securing one end of the forme to the forme carrying roller, FIGURE 9 is a fragmentary view partly in side elevation and partly in section and also on an enlarged scale illustrating the manner of securing one end of the forme to the forme carrying roller according to the arrangement seen in FIGURE 8.

Figure 11:
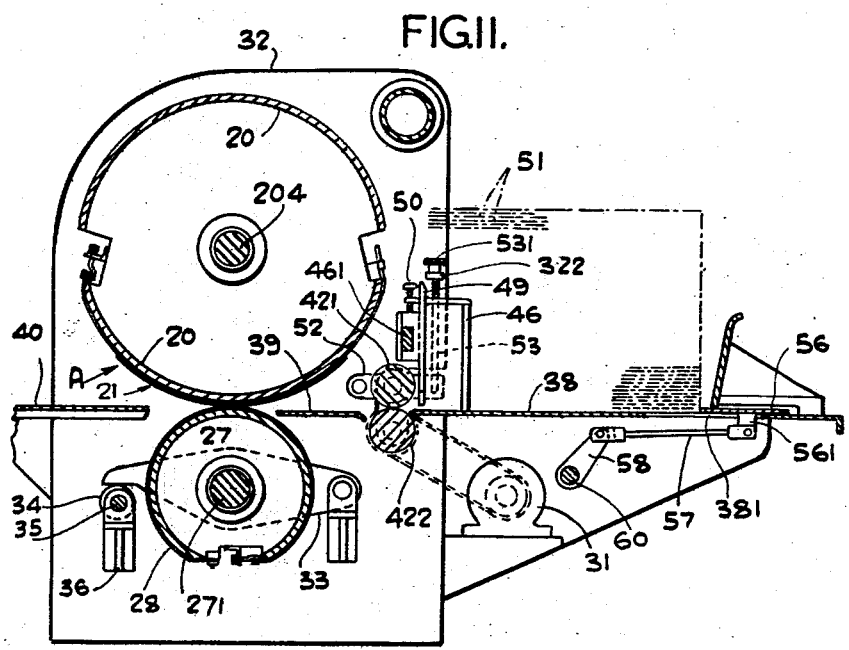
Figure 12:
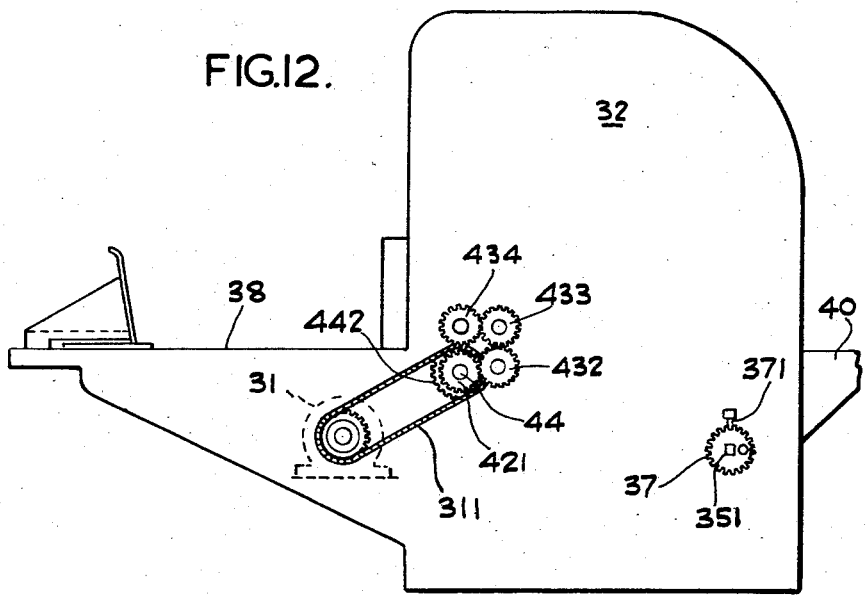
Figure 13:
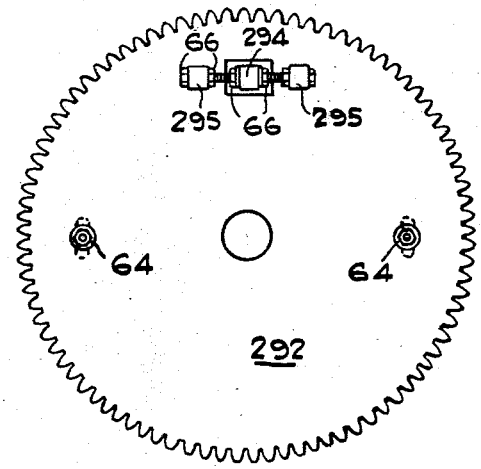
Figure 14:
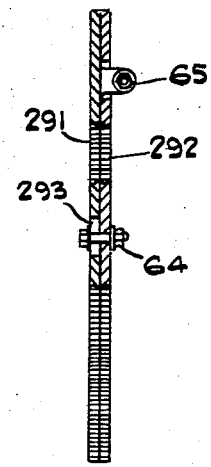

FIG. 10 is a perspective view of a machine for creasing and/or cutting cardboard in accordance with the invention, FIG. 11 is a view partly in end elevation and partly in section and on an enlarged scale of the machine illustrated in FIGURE 10, FIGURE 12 is an end view of the machine illustrated in FIGURES 10 and 11 looking from the opposite end of the machine to that seen in FIGURE 11, FIGURE 13 is an end elevation of the driving pinion for the forme carrying roller as utilised in the machine illustrated in FIGURES 10 to 12, FIGURE 14 is an end elevation of FIGURE 13, FIGURE 15 is a fragmentary view in front elevation illustrative of the manner in which a variation in the gap between the teeth of the driving pinions for the forme carrying roller results from the construction of the said pinion as illustrated in FIGURES 13 and 14.

FIGURE 16 is a fragmentary view in perspective and on an enlarged scale illustrative of the manner of adjusting the feed gates incorporated in the machine as illustrated in FIGURE 10, and FIGURE 17 is a fragmentary view in perspective on an enlarged scale of means for adjusting the upper feed roller incorporated in the machine as illustrated in FIGURE 10.

In the drawings like numerals of reference indicate similar parts in the several views.

Referring first to FIGURES 1 to 9, the forme designated generically by the reference letter A in FIGURES 1 and 4 is formed from a sheet of plywood B which is pre-shaped to fit on the circumference of the forme carrying roller 20 to which it is to be applied as will be described in greater detail hereinafter.

The conventional lengths of steel rule designated generically by the reference numeral 21 which are to constitute the creasing or cutting media are slotted as at 211 to assist in bending in the case where arcuate lengths are required and also to permit of the setting of the lengths of rule in the plywood base as seen in FIGURES 1 and 3.

For the purpose of setting the rule 21 in the plywood forme A of FIGURE 1, the plywood is slit as at 22 by a fret-saw and the protuberant portions 212 resulting from the slotting of the lengths of rule pushed into the slits 22, see FIGURE 3.

As illustrated in FIGURES 4, 5 and 6 the forme A is based on a backing B of a sheet of alloy steel conveniently of 16 S.W.G. or thereabouts which is bent to conform to the periphery of the forme carrying roller 20 to which it is to be applied.

The lengths of steel rule 21 which are to be associated with the backing B are formed from a length of strip material conveniently of alloy steel and of 16 S.W.G. or thereabouts which is bent to an angle section as seen in FIGURE 5 and slotted as at 213 to facilitate bending where this is required.

The base flanges 214 of the length or lengths of steel rule 21 may conveniently be of ⅜" whilst the upstanding limb 215 may be of like height and provided with the customary pointed creasing or cutting edge 216.

After bending the sheet metal forme of FIGURE 4 to fit the forme carrying roller 20 the bent backing B is superposed on a jig and the length or lengths of steel rule 21 secured to the forme by spot welding the base flange or flanges 214 to the arcuate backing after the rule has been cut off to the required dimensions and located at the appropriate positions.

The complete forme A is rigidly attached to the forme carrying roller 20 by engaging eyes along one end of the forme with hook bolts 23 which are carried by brackets 202 housed in recesses 201 in the forme roller 20. The other end is attached to the forme carrying roller 20 by means of screw pegs 217 in conjunction with a clamping strip 218, said screw pegs 217 being engageable within holes in a block 203 in the forme carrying roller 20. The clamping strip 218 may be locked in position by the bosses 241 of a plurality of levers 24 each fulcrumed on said block 203. The levers 24 are retained when in the locking position by spring pressed balls 242 which engage within recesses in the bosses 241 in a manner well understood. The levers 24 are housed in recesses 201 in the forme carrying roller 20 which are opposite to the recesses 201 aforesaid.

It will be understood that by manipulation of the levers 24 a forme may be locked to the forme carrying roller 20 or released therefrom as may be desired.

Referring now to the creasing or cutting machine illustrated in FIGURES 10 to 14.

According to the said figures the machine comprises an upper roller 20 which constitutes the forme carrying roller and on which the forme A which has been prepared to the shape to which the cardboard is required to be creased or cut is mounted.

This forme carrying roller 20 co-operates with a lower roller 27 constituting an impression roller and hereinafter termed as such to which is fixed in a similar manner to the forme A an arcuate sheathing 28 of a soft metal.

The forme carrying roller 20 and the impression roller 27 are intergeared by pinions 29 and 30. The lower pinion 30 is adapted to be driven from an electric motor 31 in a manner to be described hereinafter.

The axle 204 for the forme carrying roller 20 is mounted in bearings carried by end frames 32 whilst the axle 271 of the impression roller 27 is mounted in bearings carried by the central portions of a pair of lever bearers 33 arranged at opposite sides of the machine. One end of each of these lever bearers is pivoted to an end frame 32 while the other ends rest on eccentrics 34 carried by a spindle 35 turnably mounted in a pair of upstanding supports 36.

The spindle 35 is squared as at 351 for the reception of a key for turning the eccentrics 34 so that the nip between the forme carrying roller 20 and the impression roller 27 can be adjusted to suit the thickness of the cardboard to the dealt with, said spindle 35 having on the squared end 351 thereof a pinion 37 the teeth of which cooperate with a spring pressed plunger 371 for retaining the eccentrics 34 in a set position, as shown in FIG. 12.

The nip between the forme carrying roller 20 and the impression roller 27 is located in a horizontal plane which includes the upper surfaces of a stock table 38 on which the sheets of cardboard to be creased or cut are stacked, a feed table 39 for feeding the sheets into the nip of the forme carrying roller 20 and impression roller 27 and a delivery table 40.

Disposed in front of the feed table 39 is a pair of superposed feed rollers 421, 422 which are intergeared through pinions 431, 432, 433 and 434. The pinion 431 is fixed on one end of a shaft 44 which serves as the axle for the lower feed roller 422 and which carries intermediate its ends a sprocket 442 which is adapted to be driven by the electric motor 31 through the medium of a chain 311. At the opposite end to that on which the pinion 431 is mounted the said shaft 44 has fixed thereto a pinion 435, see FIGURE 10, which meshes with an idler pinion 45 which in turn is intergeared with the pinion 30 of the impression roller 27 to effect a positive driving of the impression roller 27 and the forme carrying roller 20 intergeared therewith through the medium of the pinion 29. Supported by side guides 46 mounted at the ends of the stock table 38 are the ends of a transverse bar 461 on which are slidable blocks 47 to the front of which are secured by means of bolts 48 gate plates 49 see FIGURE 14. The bolts 48 pass through elongated slots 491 in the gate plates 49 and the height of the gates 49 above the stock table is adjustable by means of screws 50 carried by the gate plates 49 and the noses whereof impinge on the blocks 47 whereby the gates 492 may be set at a height above the stock table corresponding to the thickness of the sheets of cardboard 51 to be dealt with.

The axle for the upper feed roller 421 is mounted in bearings carried by lever bearers 52 arranged at opposite sides of the machine one end of each of which is fulcrumed to the relevant end frame 32 while the other ends are connected to rods 53 which are screw-threaded at their upper ends for engagement by a nut 531. The upper portion of the rod 53 passes freely through holes in the side guides 46 and in brackets 322 fixed to the relevant end frames 32 so that by manipulating the nuts 531 the lever bearers 52 can be caused to effect an adjustment of the nip between the feed rollers 421, 422 to suit the thickness of the sheets of cardboard to be creased.

Mounted on the upper surface of the stock table 38 is a slide 56 having a centrally disposed ear 561 which depends through an elongated slot 381 in the stock table see FIGURE 11. This ear 561 is pivotally connected to one end of a connecting rod 57 the other end of which is pivotally connected to a crank 58 carried by a shaft 60 having on the outer end a crank 61 which is connected to one end of a connecting rod 62 the other end of which has pivotal connection to a crank pin 291 carried by the driving pinion 29 of the forme carrying roller 20.

In order to ensure meshing of the teeth of the driving pinion 29 for the forme carrying roller 20 with the teeth of the driving pinion 30 of the impression roller 27 consequent upon adjustment of the nip of the forme carrying roller 20 and impression roller 27 the said pinion is formed in two parts 291, 292 see FIGURES 13 and 14, which are held together by bolts 64 the shanks of which pass through elongated slots 293 in the inner part 291.

The inner part 291 is provided with an ear piece 294 which passes through slots in the outer part and carries a screw 65 the ends of which are engageable with ear pieces 295 carried by the outer part 292, so that by slackening the nuts 641 associated with the bolts 64 and turning the screw 65 the one part of the pinion 29 can be adjusted slightly relatively to the other part so as to take up the gap between the teeth which will obtain when the nip between the forme carrying roller 20 and the impression roller 27 is widened (see FIGURE 17).

The screw 65 is locked in a set position by means of sets of nuts 66.

It is to be understood in the foregoing description the singular number is used in places for ease of description although there are or may be complementary items at each side of the machine.

The sheets of carboard 51 to be creased are supplied from a hopper not shown and stacked in superposed relationship on the stock table 38 with the slide 56 occupying the extreme outer portion of its stroke.

The gates 492 are then set to serve as an abutment for the forward end of the stack but with the lower edges of the said gates 492 spaced above the surface of the stock table 38 at a height slightly in excess of the thickness of the individual sheets 51 of cardboard in the stack.

It will be understood that adjustment of the gates 492 is effected by manipulation of the screws 50 after first slackening the bolts 48.

It will be understood that the forme A and the sheath 28 are mounted so that the forme A and sheath 28 are in opposed relationship during a creasing or cutting operation.

The drive is transmitted from the motor 31 to sprocket 442, thence to the shaft 44 and by way of the pinion 435 and idler pinion 45 to the pinion 30 and thence to pinion 29.

Rotation of the shaft 44 involves rotation of the pinion 431 and consequently of pinions 432, 433 and 434 thereby involving a positive driving of the feed rollers 421, 422.

As the driving pinion 29 for the forme carrying roller 20 rotates the slide 56 is reciprocated through the cranks 58 and 61, connecting rod 62 and crank pin 621 and thereby caused on each forward movement to push the then lowermost sheet of the stack of sheets 51 below the gates 491 and into the nip of the feed rollers 421, 422.

The feed rollers 421, 422 in turn feed the sheet over the feed table 39 into the nip between the forme carrying roller 20 and the sheath 28 carried by the impression roller 27.

In its progress between the forme carrying roller 20 and the impression roller 27, the sheet is creased and/or cut by means of the steel rule 21 of the forme A in conjunction with the soft metal of the sheath mounted on the impression roller 27.

The creased or cut sheet is delivered on to the delivery platform 40 whence it may be removed manually or by a conveying means as may be preferred.

It will be understood that if the machine is required to effect severence of the sheets of cardboard the nip between the forme carrying roller 20 and the sheath 28 of the impression roller 27 is set so that during rotation the cutting edge 216 of the steel rule will bite through the cardboard and cut into the periphery of the sheath 28.

Conversely if the machine is required to effect creasing wtihout severance the nip between the forme carrying roller 20 and the impression roller 27 is adjusted accordingly.

It will be understood that formes may be changed as required and likewise also the sheath of the impression roller.

Conveniently the sheath 28 for the impression roller 27 is removed after the termination of a sequence of creasing operations and is renewed when a new forme is to be employed.

If the machine is required to effect severance of the sheets of cardboard, the steel rule in the forme of the forme carrying roller may be set appropirately.

Moreover if desired provision may be made for simultaneous creasing or cutting in which event the cutting "rule" is made of a greater effective depth than the creasing rule.

It will be appreciated that the improved apparatus for creasing and cutting cardboard enables a higher rate of production to be achieved than is obtainable with existent practice thereby making for economy in production.

It will be appreciated also that the machine of this invention is capable of dealing with both "solid" and corrugated cardboard and with analogous flexible sheet material such for example as the materials known as "Corrugated Container Board" and flexible composite cork sheeting.

Further it will be appreciated that the arcuate "forme" may be made of a material other than plywood and sheet metal for example a synthetic plastics material.

We claim:
1. A machine for creasing and/or cutting cardboard and analogous flexible sheet material incorporating a roller, a detachable forme of bendable sheet material bent to an arcuate formation corresponding to the curvature of said roller, lengths of rule arranged to the contour of the desired lines of creasing and/or severance carried by said forme, means for securing the said forme to said roller which also serves to hold the forme in contact with the periphery of the roller, an impression roller adapted to cooperate with the forme carrying roller, a detachable sheath of bendable sheet material bent to an arcuate formation corresponding to the curvature of the said impression roller, means for securing said sheath to said impression roller which also serves to hold the sheath in firm contact with the periphery of the impression roller, gearing interconnecting the forme carrying roller and the impression roller, a power source, means for imparting a positive drive from the power source to said forme carrying roller and impression roller and means for adjusting the nip between the forme carrying roller and the impression roller.

2. A machine for creasing and/or cutting cardboard and analogous flexible sheet material as claimed in claim 1 in which the means for securing the forme to the forme carrying roller incorporates hook-bolt means for engagement with one end of the forme and a clamping strip carried by the other end of the forme and which is engageable with means carried by the said roller and quickly releasable lever means for securing the clamping strip to and releasing the said clamping strip from the forme carrying roller as required.

3. A machine for creasing and/or cutting cardboard and analogous flexible sheet material as claimed in claim 1 in which the means for securing the sheathing to the impression roller comprises hook-bolt means engageable with one end of the sheathing, a clamping strip carried by the other end of the sheathing and engageable with means carried by the impression roller and quickly releasable lever means for securing the clamping strip to and releasing the said clamping strip from the engageable means carried by the impression roller as required.

4. A machine for creasing and/or cutting cardboard and analogous flexible sheet material as claimed in claim 1 in which the drive is transmitted from the impression roller to the forme carrying roller through intermeshing pinions and in which provision is made for varying the width of the gap between the teeth of a pinion to compensate for variations arising from the adjustment of the nip between the forme carrying roller and the impression roller.

5. A machine for creasing and/or cutting cardboard and analogous flexible sheet material as claimed in claim 4 in which a pinion is formed in two toothed parts capable of relative movement between each other and in which provision is made for securing the two parts together in an adjusted relationship.

References Cited by the Examiner
UNITED STATES PATENTS

| 972,300 | 10/10 | Vayra | 93—58.2 |
| 2,081,583 | 5/37 | Fitchett | 93—58.2 |
| 2,110,212 | 3/38 | Fitchett | 93—58.2 X |

FOREIGN PATENTS

| 867,049 | 2/53 | Germany. |

FRANK E. BAILEY, *Primary Examiner.*
BERNARD STICKNEY, *Examiner.*